United States Patent
Radmanic

(10) Patent No.: US 8,967,707 B2
(45) Date of Patent: Mar. 3, 2015

(54) INITIALIZATION STOP FOR A SLIDING ROOF CONTROL MECHANISM

(75) Inventor: Stjepan Radmanic, Mammendorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/992,969

(22) PCT Filed: Nov. 30, 2011

(86) PCT No.: PCT/EP2011/071351
§ 371 (c)(1),
(2), (4) Date: Aug. 26, 2013

(87) PCT Pub. No.: WO2012/084434
PCT Pub. Date: Jun. 28, 2012

(65) Prior Publication Data
US 2013/0320717 A1 Dec. 5, 2013

(30) Foreign Application Priority Data
Dec. 21, 2010 (DE) .......................... 10 2010 055 456

(51) Int. Cl.
*B60J 7/057* (2006.01)
(52) U.S. Cl.
CPC ................ *B60J 7/057* (2013.01); *B60J 7/0573* (2013.01)
USPC ........................ 296/223; 296/216.08; 296/224
(58) Field of Classification Search
USPC ..................................... 296/223, 224, 216.08
See application file for complete search history.

(56) References Cited

U.S. PATENT DOCUMENTS

| 4,732,422 A * | 3/1988 | Schlapp et al. ................ 296/221 |
| 5,326,149 A * | 7/1994 | Schlapp ......................... 296/224 |
| 5,580,123 A * | 12/1996 | Ochiai ............................ 296/223 |
| 7,950,733 B2 * | 5/2011 | Farber ............................ 296/221 |
| 2001/0008347 A1 | 7/2001 | Ito et al. |
| 2008/0303316 A1 | 12/2008 | Mooney et al. |
| 2009/0072588 A1 * | 3/2009 | Nakamura ................ 296/216.04 |

FOREIGN PATENT DOCUMENTS

DE 3801881 A1 8/1988

* cited by examiner

*Primary Examiner* — Dennis H Pedder
(74) *Attorney, Agent, or Firm* — Fitch, Even, Tabin & Flannery LLP

(57) ABSTRACT

What is proposed is a vehicle roof which has a cover element which can be used to selectively close or at least partially expose a roof opening and which, with respect to a vertical vehicle longitudinal center plane, has a control mechanism for the cover element on each of the two sides, said control mechanism comprising a drive carriage which can be moved in a respective roof-mounted guide rail and controls a pivoting and/or displacement of the cover element, wherein the drive carriages are each connected to a pressure-resistant drive cable which can be driven by means of a drive motor. At least one of the control mechanisms has an initialization stop which, in a front or a rear end position of the cover element, engages in a corresponding guide rail cutout whose edge forms a counter-stop for the initialization stop.

9 Claims, 5 Drawing Sheets

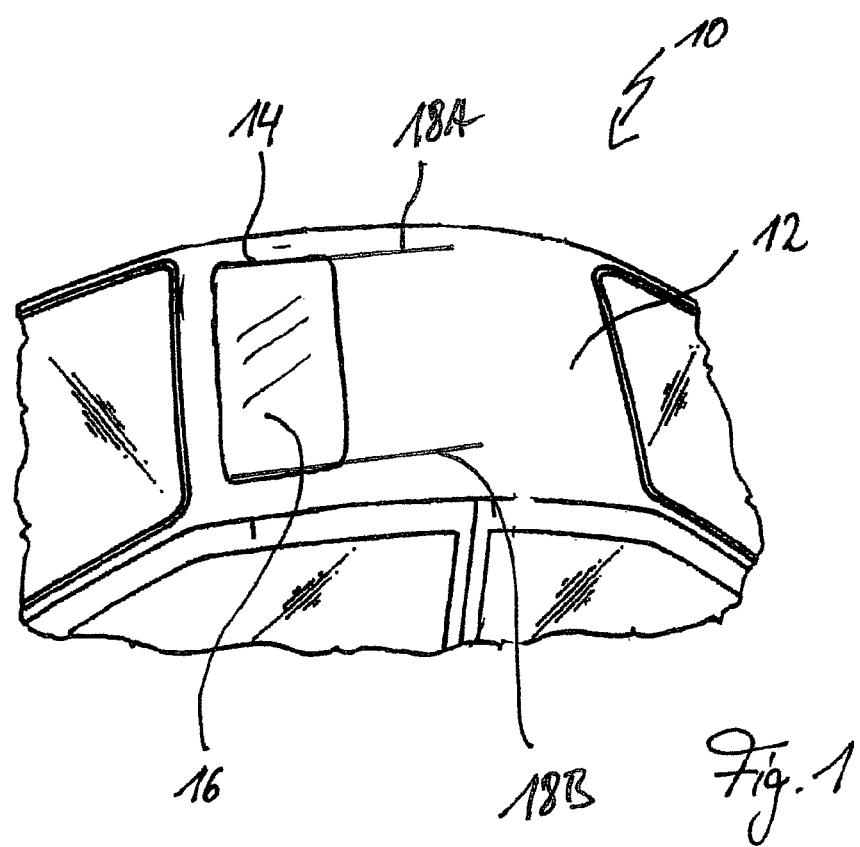

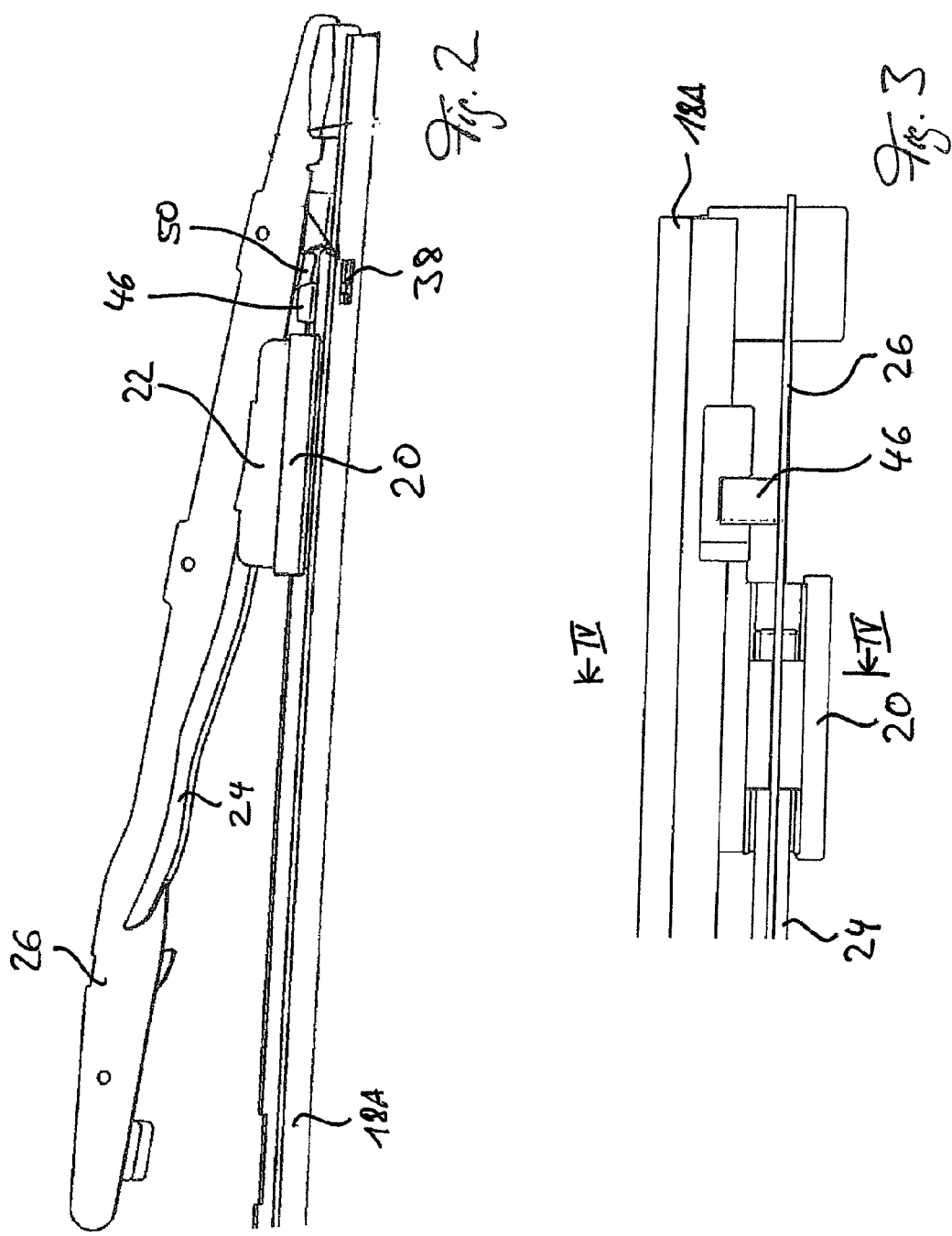

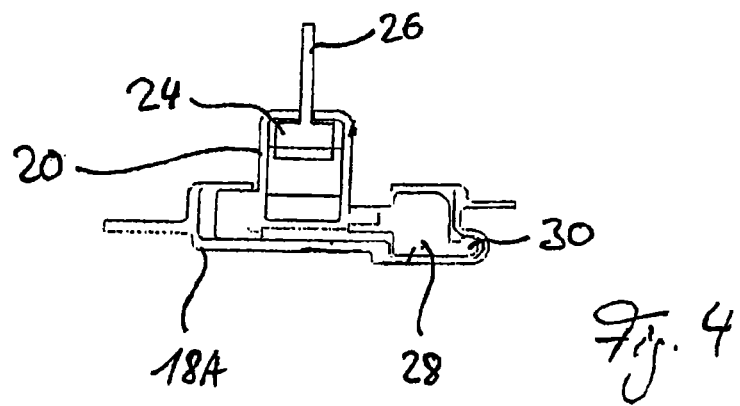
Fig. 4
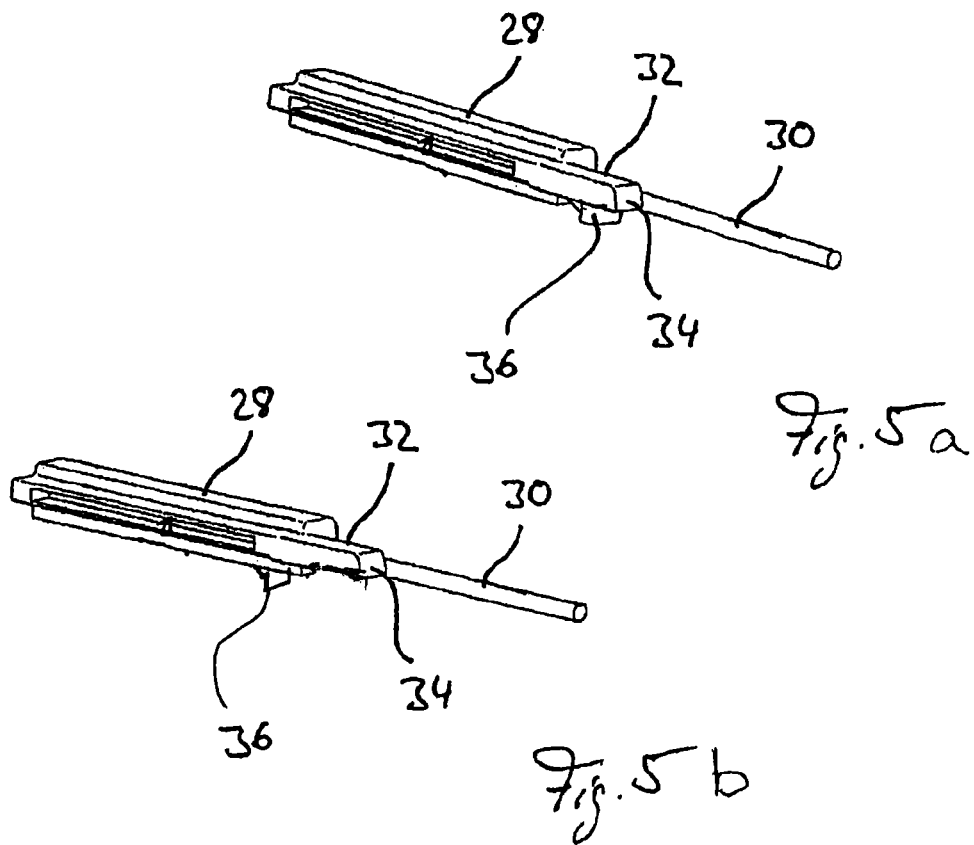
Fig. 5a
Fig. 5b

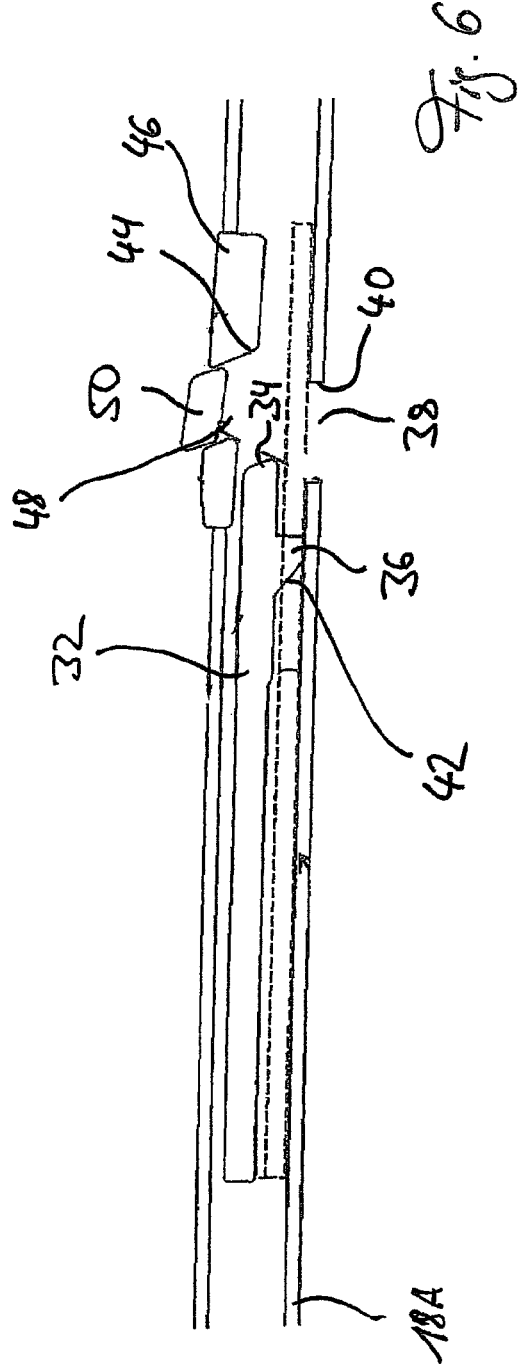
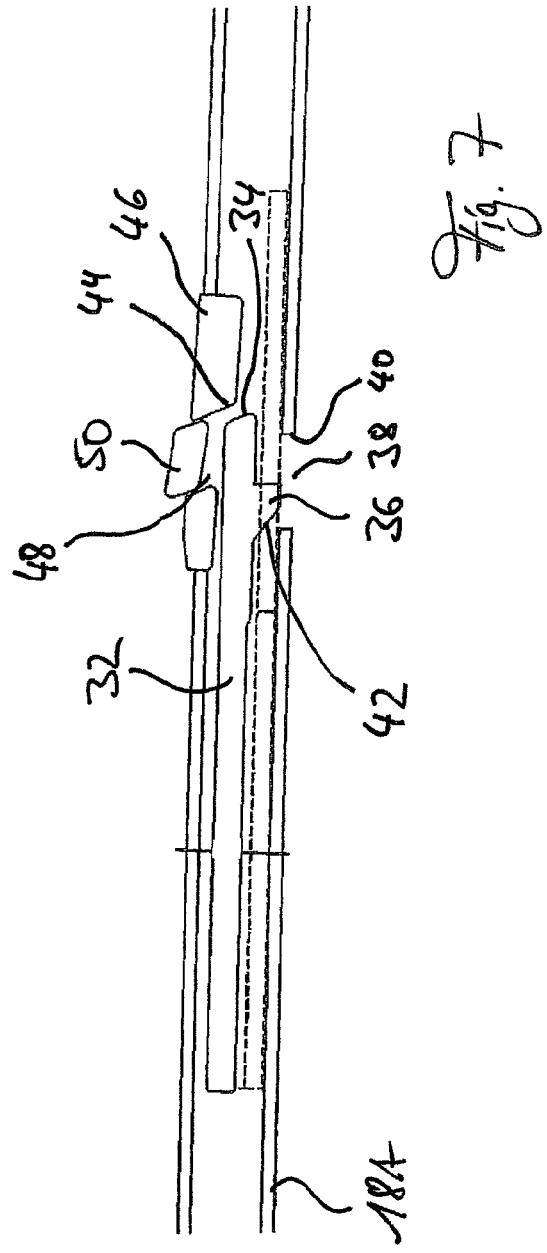

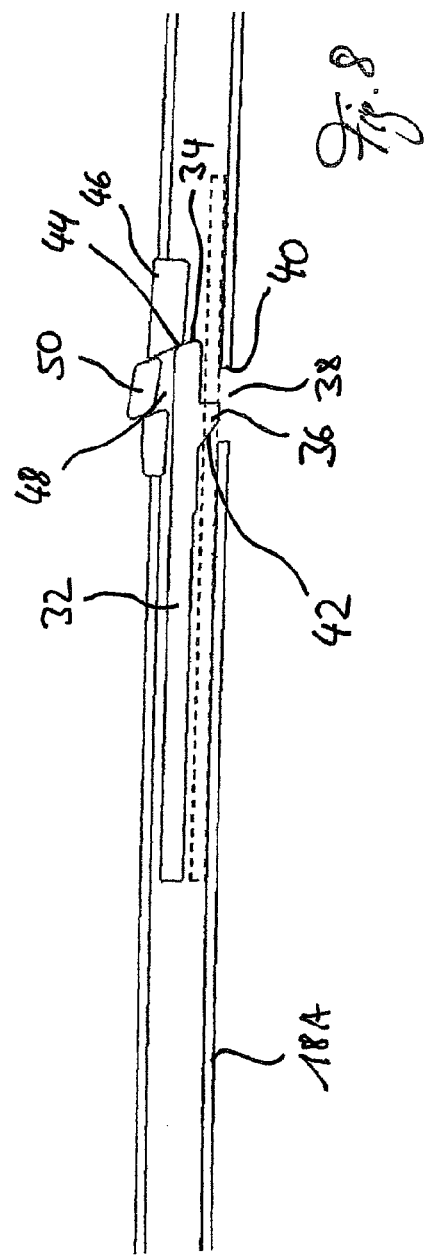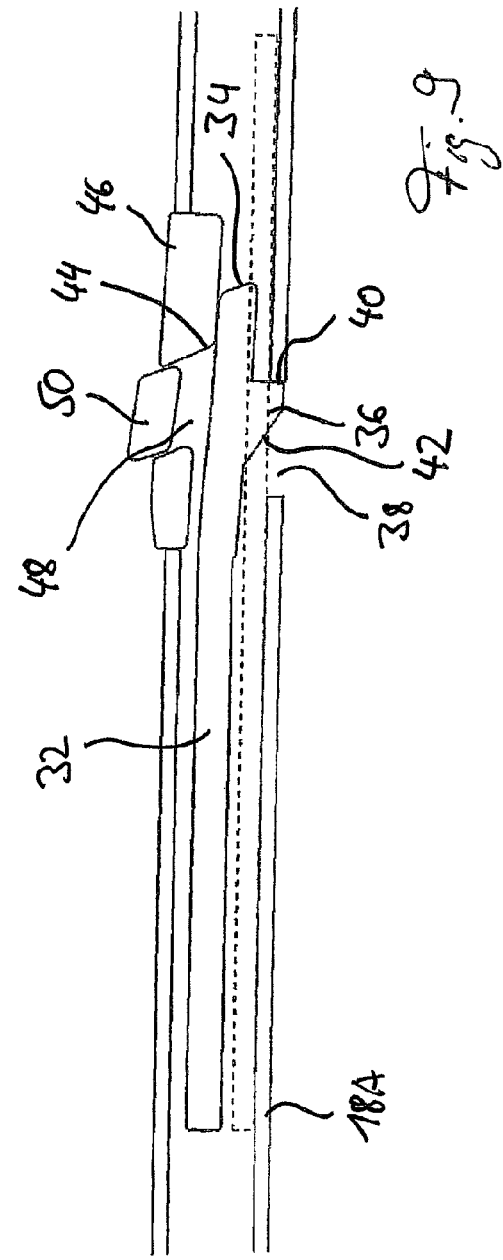

INITIALIZATION STOP FOR A SLIDING ROOF CONTROL MECHANISM

CROSS REFERENCE TO RELATED APPLICATIONS

This application is a U.S. national phase application of International Application No. PCT/EP2011/071351, filed Nov. 30, 2011, designating Europe, which claims benefit from German Application No. 10 2010 055 456.1, filed Dec. 21, 2010, which are hereby incorporated herein by reference in their entirety.

The disclosure relates to a vehicle roof with a cover element which can be used to selectively close or at least partially expose a roof opening.

Such a vehicle roof is known from DE 10 2007 001 286 A1 and comprises a roof opening which can be selectively closed or at least partially exposed by means of the cover element. With respect to a vertical vehicle longitudinal center plane, the vehicle roof comprises a control mechanism for the cover element on each of the two sides, said control mechanism comprising a drive carriage which can be moved in a respective roof-mounted guide rail and controls a pivoting and a displacement of the cover element. For this purpose, the drive carriage engages around a guide web which is formed on a carrier of the cover element. The guide web is designed in the manner of a control slideway such that the setting angle of the cover element with respect to adjoining, fixed roof regions can be fixed as a function of the position of the drive carriage in the guide rail. The drive carriages are each connected to a pressure-resistant drive cable which can be driven by means of a drive motor.

In order to be able always to determine the exact position of the cover element with respect to the rigid roof regions or to be able to move the cover element in a positionally accurate manner, it is required that control electronics detect at least one end position for the travel of the drive carriages, which position is used as starting point for the movement of the cover element. This has been carried out hitherto by means of a stop which is formed by a notch in the guide rail and onto which the drive carriage can run. During a restart of the system, it is required that this stop is abutted by the drive carriage for initialization. However, the notch in the guide rail has the disadvantage that a frequent abutment by the drive carriage can lead to high loading on and also damage to the guide rail and/or the drive carriage. In particular, it has also been observed that the notch is broken after an abutment of the drive carriage. Furthermore, the notch, which forms a raised tab, can constitute a risk of injury for a user of the respective vehicle.

The object of the invention is to provide a vehicle roof of the generic type mentioned in the introductory part with an optimized initialization stop.

This object is achieved according to the invention by the vehicle roof having the features of patent claim 1.

The essence of the invention therefore consists in that an initialization stop is in each case formed in the control mechanisms for actuating the cover element, which stop interacts with a cutout, that is to say with a window of the respective guide rail, in such a way that the edge of the cutout forms a counter-stop for the initialization stop. On the guide rail of the vehicle roof according to the invention there is therefore not formed any notch and any upwardly bent part which, during a frequent abutment of the respective control mechanism, could break or else constitutes a risk of injury for a user or else a fitter of the sliding roof system who engages in the guide rail.

In a preferred embodiment of the vehicle roof according to the invention, the initialization stops are each formed on one of the drive carriages. Thus, during the movement of the drive carriages, the initialization stops are guided in particular in a guide path of the respective guide rail. Only on reaching the corresponding guide rail cutout does the respective initialization stop enter this cutout such that it can run onto the counter-stop formed by the edge of the respective cutout.

In a special embodiment of the vehicle roof according to the invention, the initialization stops are each formed on a cable attachment element of the respective drive carriage. Attachment elements for drive cables of drive carriages of a sliding roof are generally produced from a plastic injection-molded part which can be connected to a drive carriage body via a plug connection. The initialization stops can thus be produced in a cost-effective manner by correspondingly designing the mold for the cable attachment elements.

In order that the initialization stops can automatically enter the guide rail cutouts or have a restoring capacity after moving out of the respective guide rail cutout, in a preferred embodiment of the vehicle roof according to the invention they are designed to be resilient.

In an expedient embodiment of the vehicle roof according to the invention, the initialization stops are each formed by a stop finger which extends in the displacement direction of the respective drive carriage. Such a stop finger does not require any additional installation space and can generally be integrated without problem in a guide path of an existing guide rail. Consequently, the initialization arrangement formed in the context of the invention can be integrated in existing control mechanisms for a sliding roof by means of slight modifications.

In order that, on reaching the guide rail cutouts, the stop fingers can be guided into the guide rail cutout without catching, the stop fingers preferably each have an inclined end face which interacts with a counter-surface fixed on the guide rail. When the stop finger runs onto the counter-surface, the stop finger is thus bent according to the inclination of the inclined end face such that the initialization stop enters the corresponding guide rail cutout. Preferably, for this purpose, the guide rails have, in the region of the guide rail cutout, a respective run-on ramp for the respective stop finger, which ramp, during the run-on of the stop finger, presses the respective initialization stop into the respective guide rail cutout and holds it therein.

According to a preferred embodiment of the vehicle roof according to the invention, the run-on ramp is formed by an insert, formed in particular from a plastic, of the respective guide rail, which insert is latched with the guide rail.

To save costs and to simplify the construction of the control mechanisms, the insert can furthermore define an outlet path for a control cam of a cover carrier of the cover element. During displacement of the cover element, the control cam is guided in a guide path of the guide rail such that a pivoting of the cover element or of the cover carrier is blocked. In the closed position and the ventilation position of the cover element, in which the cover element is opened out with respect to the fixed roof sections, the control cam enters the outlet path such that a displacement of the cover element in the vehicle longitudinal direction is blocked by the boundary walls of the insert.

In order to ensure that the initialization stops can be brought out of the guide rail cutouts in an at least substantially resistant-free manner, the initialization stops expediently have, at their side facing away from the respective counter-stop, a bevel which supports a movement of the respective initialization stop out of the respective guide rail cutout.

Further advantages and advantageous refinements of the subject matter of the invention can be found in the description, the drawing and the patent claims.

An exemplary embodiment of a vehicle roof according to the invention is illustrated in a schematically simplified form in the drawing and is explained in more detail in the description which follows. In the drawing:

FIG. 1 shows a perspective, highly schematic view of a vehicle roof according to the invention;

FIG. 2 shows a view of a control mechanism of the vehicle roof obliquely from below;

FIG. 3 shows a plan view of the control mechanism;

FIG. 4 shows a section through the control mechanism along the line IV-IV in FIG. 3;

FIG. 5 shows a cable attachment of the control mechanism on with the initialization stop formed on the finger stop (FIG. 5a) and the initialization stop formed on the cable attachment element (FIG. 5b);

FIG. 6 shows a longitudinal section through the control mechanism, wherein a stop finger is illustrated during the movement of the control mechanism in a guide rail;

FIG. 7 shows a longitudinal section corresponding to FIG. 6, but with an arrangement of the stop finger above a guide rail cutout;

FIG. 8 likewise shows a longitudinal section corresponding to FIG. 6, but with the stop finger running onto a run-on ramp; and FIG. 9 likewise shows a longitudinal section corresponding to FIG. 6, after the stop finger has run onto a counter-stop.

FIG. 1 depicts a motor vehicle 10 which is formed with a rigid vehicle roof 12 which has a roof opening 14 which can be selectively closed or at least partially exposed by means of a cover element 16. For this purpose, the cover element can be displaced in the vehicle longitudinal direction along guide rails 18A and 18B which, with respect to a vertical vehicle longitudinal center plane, are arranged on both sides of the roof opening 14. Furthermore, starting from its closed position illustrated in FIG. 1, the cover element 16 can be pivoted into a so-called ventilation position in which it is opened out with respect to the rigid vehicle roof 12.

To adjust the cover element 16, a control mechanism is arranged on each of the two sides in the region of the guide rails 18A and 18B, which control mechanism, as can be seen from FIG. 2, comprises a drive carriage 20 which can be moved in the respective guide rail 18A or 18B. In FIG. 2, the drive carriage 20 for the guide rail 18A is depicted. The control mechanism in the region of the second guide rail 18B is formed in a mirror-inverted manner to the control mechanism in the region of the guide rail 18A. Therefore, for the sake of clarity, a description of the control mechanism arranged in the region of the guide rail 18B will be omitted in the text which follows.

The drive carriage 20 has an upper claw section 22 which engages around a slideway-like guide web 24 of a cover carrier 26 which is rigidly connected to the cover element 16. A movement of the drive carriage 20 in the guide rail 18A and along the guide web 24 of the cover carrier 26 thus results in a pivoting of the cover element 16.

For displacement purposes, the drive carriage 20 is connected via a cable attachment element 28 to a pressure-resistant drive cable 30 which is guided in a guide path of the guide rail 18A and can be actuated by means of an electric drive which is not illustrated in more detail. The cable attachment element 28 constitutes a plastic encapsulation of the drive cable 30 and is connected via a plug mechanism to the body of the drive carriage 20.

A so-called stop finger 32 is formed on the drive carriage 20 or the cable attachment element 28 of the drive carriage 20, said stop finger projecting forwardly with respect to the cable attachment element 28 parallel to the extension of the guide rail 18A and being designed to be flexurally elastic or resilient. The stop finger 32 has an end face 34 which, with respect to a plane which intersects the guide rail 19A at a right angle in the transverse direction, is inclined obliquely and constitutes an active face of the stop finger 32. Furthermore, the stop finger 32 has, at its underside, a stop element 36 which constitutes an initialization stop which interacts with a cutout 38 whose front edge 40 forms a counter-stop for the stop element 36. At its side facing away from the edge 40, the stop element 36 has a bevel 42 which supports a movement of the stop element 36 out of the cut-out 38.

In order to bend the resiliently formed stop finger 32 elastically on reaching the cutout 38 in the guide rail 18A such that the stop element 36 enters the cutout 38, the guide rail 18A has a run-on ramp 44, acting in the manner of a slideway, for the end face 34 of the stop finger 32, which ramp is formed by an upper-side insert 46 of the guide rail 18A. The insert 46 furthermore defines an outlet path for a control cam 50 which projects from the cover carrier 26 in the vehicle transverse direction, and therefore has a dual function. With an arrangement in the outlet path 48, the control cam 50 blocks a displacement of the cover element 16 in the vehicle longitudinal direction.

By means of the stop element 36 formed by the stop finger 32, it is possible by interaction with the counter-stop formed by the edge 40 to achieve an initialization of the cover element drive system, which initialization is required during the start-up of the drive system in order to ensure a positionally accurate movement of the cover element 16. When the stop element 36 runs onto the edge 40, a sliding roof controller detects a front end position of the drive carriage 20, starting from which the cover element 16 can be moved or pivoted into desired positions by a corresponding activation of the electric drive.

In the normal operation of the above-described lift-and-slide roof, the stop finger 32 formed on the cable attachment element 28 of the drive carriage 20 is moved in a guide channel of the guide rail 18A in a protected and concealed manner without function.

For initialization, the drive carriage 20 is moved from an arbitrary position in the forward direction, with the result that the cover element 16 is initially brought into the closed position and then into its opened out ventilation position. The stop finger 32 is now arranged in the region of the initialization cutout 38 in the guide rail 18A (cf. FIG. 7). During a further movement of the drive carriage 20 in the direction of the vehicle front end, the stop finger 32 runs with its end face 34 onto the run-on bevel 44 formed by the insert 46, which bevel then acts in the manner of a control slideway and bends the stop finger 32 downward such that the stop element 36 enters the cutout 38 (cf. FIG. 8). The drive carriage 20 is now moved further in the direction of the vehicle front end until the stop element 36 runs onto the front edge 40 of the rectangular cutout 38 and an initialization of the system takes place (cf. FIG. 9). In this position, the stop finger 32 is blocked by means of the insert 46 from being deflected upward. The insert 46 thus forms an upper stop for the stop finger 32. After the initialization, the drive carriage 20 is moved by a certain value in the direction of the vehicle rear until a carriage position is reached which corresponds to the ventilation position of the cover element 16.

Alternatively or in addition, the control mechanism could also have an initialization stop which is formed on a stop finger of the control mechanism in a manner corresponding to the above-described initialization stop, but can be activated in a rear-side end position of the drive carriage.

The invention claimed is:

1. A vehicle roof which has a cover element which can be used to selectively close or at least partially expose a roof opening and which, with respect to a vertical vehicle longitudinal center plane, has a control mechanism for the cover element on each of the two sides, said control mechanism comprising:
   a drive carriage which can be moved in a respective roof-mounted guide rail and controls a pivoting and/or displacement of the cover element,
   wherein the drive carriages are each connected to a pressure-resistant drive cable which can be driven by means of a drive motor,
   wherein at least one of the drive carriages has an initialization stop which, in an end position of the cover element, engages in a corresponding guide rail cutout whose edge forms a counter-stop for the initialization stop.

2. The vehicle roof as claimed in claim 1, wherein the initialization stop is designed to be resilient.

3. The vehicle roof as claimed in claim 1, wherein the initialization stop is formed by a stop finger which extends in the displacement direction of the respective drive carriage.

4. The vehicle roof as claimed in claim 3, wherein the stop finger has an inclined end face.

5. The vehicle roof as claimed in claim 3, wherein, in the region of the guide rail cutout, the guide rail has a run-on ramp for the stop finger, which ramp, during a run-on of the stop finger, presses the initialization stop into the guide rail cutout.

6. The vehicle roof as claimed in claim 5, wherein the run-on ramp is formed by an insert of the guide rail.

7. The vehicle roof as claimed in claim 1, wherein the initialization stop has, on its side facing away from the respective counter-stop, a bevel which supports a movement of the initialization stop out of the guide rail cutout.

8. A vehicle roof which has a cover element which can be used to selectively close or at least partially expose a roof opening and which, with respect to a vertical vehicle longitudinal center plane, has a control mechanism for the cover element on each of the two sides, said control mechanism comprising:
   a drive carriage which can be moved in a respective roof-mounted guide rail and controls a pivoting and/or displacement of the cover element,
   wherein the drive carriages are each connected to a pressure-resistant drive cable which can be driven by means of a drive motor,
   wherein at least one of the control mechanisms has an initialization stop which, in an end position of the cover element, engages in a corresponding guide rail cutout whose edge forms a counter-stop for the initialization stop,
   wherein the initialization stop is formed by a stop finger which extends in the displacement direction of the respective drive carriage,
   wherein, in the region of the guide rail cutout, the guide rail has a run-on ramp for the stop finger, which ramp, during a run-on of the stop finger, presses the initialization stop into the guide rail cutout,
   wherein the run-on ramp is formed by an insert of the guide rail, and
   wherein the insert defines an outlet path for a control cam of a cover carrier of the cover element.

9. A vehicle roof which has a cover element which can be used to selectively close or at least partially expose a roof opening and which, with respect to a vertical vehicle longitudinal center plane, has a control mechanism for the cover element on each of the two sides, said control mechanism comprising:
   a drive carriage which can be moved in a respective roof-mounted guide rail and controls a pivoting and/or displacement of the cover element,
   wherein the drive carriages are each connected to a pressure-resistant drive cable which can be driven by means of a drive motor, and
   wherein at least one of the control mechanisms has an initialization stop which, in an end position of the cover element, engages in a corresponding guide rail cutout whose edge forms a counter-stop for the initialization stop formed on a cable attachment element of one of the drive carriages.

* * * * *